US006650892B1

(12) United States Patent
Thiriet

(10) Patent No.: US 6,650,892 B1
(45) Date of Patent: Nov. 18, 2003

(54) MOBILE COMMUNICATIONS APPARATUS ADAPTED FOR EXECUTING COMPUTER GAME PROGRAMS

(75) Inventor: Fabien Thiriet, Orleans (FR)

(73) Assignee: Solaic, Montrouge (FR)

( * ) Notice: Subject to any disclaimer, the term of this patent is extended or adjusted under 35 U.S.C. 154(b) by 0 days.

(21) Appl. No.: 09/028,706

(22) Filed: Feb. 24, 1998

(51) Int. Cl.[7] .......................... H04M 3/00; H04M 1/00; H04Q 7/20; A63F 3/00; A63F 13/00

(52) U.S. Cl. ....................... 455/419; 455/418; 455/425; 455/466; 455/550.1; 455/558; 273/236; 273/292; 463/41

(58) Field of Search ................................ 455/550, 551, 455/556, 557, 558, 575, 413–420, 466, 425, 550.1; 273/236, 292, 293, 237, 269, 143, 148 B, 148 R; 235/380; 463/40–42, 25–29, 9–12, 16–20, 36–39, 43, 44

(56) References Cited

U.S. PATENT DOCUMENTS 5,072,381 A * 12/1991 Richardson et al. ........ 364/410
5,535,423 A * 7/1996 Dupuy ...................... 455/33.1
5,697,844 A * 12/1997 Von Kohorn ................ 463/40
5,766,076 A * 6/1998 Pease et al. .................. 463/27
5,771,064 A * 6/1998 Lett ............................ 348/10
5,877,975 A * 3/1999 Jigour et al. .................. 365/52
5,915,225 A * 6/1999 Mills .......................... 455/558
5,940,769 A * 8/1999 Nakajima et al. ........... 455/509
5,999,808 A * 12/1999 LaDue ....................... 455/412
6,011,976 A * 1/2000 Michaels et al. ........... 455/466
6,024,640 A * 2/2000 Walker et al. ................ 463/17
6,035,189 A * 3/2000 Ali-Vehmas et al. ........ 455/414
6,138,002 A * 10/2000 Alperovich et al. ........ 455/407
6,169,911 B1 * 1/2001 Wagner et al. .............. 455/566

FOREIGN PATENT DOCUMENTS

DE 19610840 A1 * 9/1997 ............ H04B/7/26
EP 0 562 890 A1 * 9/1993 ............ H04Q/7/26

OTHER PUBLICATIONS

SETTS 89; Seventh International Conference, Bellcore, USA.*

IEEE/IEE Electronic Library online search: Okazaki et al.: IEEE Transaction on Consumer Electronics, vol. 38, No. 3, Aug. 1992 ; Nippon Telegraph and Telephone Corporation; 1–2356 Take Yokosuka, Japan 238–03.*

IEEE/IEE Electronic Library online search: Michael C. McChesney; Banking/Investing; Banking in Cyberspace: IEEE Spectrum: Feb. 1997.*

* cited by examiner

*Primary Examiner*—William Trost
*Assistant Examiner*—Meless Zewdu
(74) *Attorney, Agent, or Firm*—Cohen, Pontani, Lieberman & Pavane

(57) ABSTRACT

A mobile apparatus includes a cellular telephone and a subscriber identification module ("SIM"). SIMs include an interpreter written in a computer language. A game program, which is written in the same computer language, is loaded into the memory of the SIM and is interpreted by the SIM's interpreter. The game program is then executed by the cellular telephone so that the game can be played.

13 Claims, 1 Drawing Sheet

AUC
HLR
VLR
MSC
NSS
BSC
BTS
BTS
BTS
MS
RMO
ME
PRM
DIS
KEY
SPE
SIM
ROM
RAM
$\mu$P
EEPROM

MOBILE COMMUNICATIONS APPARATUS ADAPTED FOR EXECUTING COMPUTER GAME PROGRAMS

FIELD OF THE INVENTION

The present invention is directed to a mobile communications apparatus that is part of a telecommunication network and, in particular, to such a mobile communications apparatus which is adapted to execute computer game programs.

BACKGROUND OF THE INVENTION

Telecommunication networks have been established for providing a variety of services to network subscribers. Some widely used and well known telecommunication networks provide mobile telephone communication services, such as with cellular telephones. Other telecommunication networks provide services which involve banking operations and electronic bulletin board functions, for example.

It is necessary in at least some instances for such telecommunication networks to provide secure transmissions. For a mobile telephone network, for example, transmissions made from the mobile telephone include secret authorization codes needed to gain access to the service.

One way for providing such secure transmissions is to use a subscriber identification module ("SIM") which can be plugged into or detached from the phone. Data stored in the SIM controls access by the phone to the network services. Recent versions of the SIM include an interpreter of programs written in a high level computer language, such as JAVA. Such a SIM is disclosed by the European Telecommunications Standards Institute (ETSI) in its GSM Technical Specification GSM 11.11 of July 1996, Version 5.3.0, which is hereby incorporated by reference. Information on the interpreter, and also on the SIM, is provided in U.S. patent application Serial No. 08/957,512 filed Oct. 24, 1997, which is hereby incorporated by reference. Such prior art mobile telephones and SIMs have so far been focused on performing only the specific tasks involved in telephony.

SUMMARY OF THE INVENTION

One object of the present invention is to expand the versatility of a telecommunication network.

Another object of the present invention is to provide a mobile telephone network with capabilities other than telephony.

A further object of the present invention is to use the capabilities available in a SIM plugged into a mobile telephone for executing computer game programs.

These and other objects are attained in accordance with one aspect of the present invention by a method of using a mobile apparatus having a screen, a keyboard and a loudspeaker. The mobile apparatus is provided with a subscriber identification module (SIM). The SIM includes an interpreter of programs written in a computer language. The mobile apparatus is part of a telecommunication network managed by an operator. To perform this method, a game program written in the computer language is loaded into a memory of the SIM, and the game program is interpreted by the interpreter of the SIM. Then, the game program is executed by the mobile apparatus so that the game can be played.

BRIEF DESCRIPTION OF THE DRAWING

The FIGURE is a schematic block diagram of the circuitry of the present invention.

DETAILED DESCRIPTION OF THE PREFERRED EMBODIMENT

Figure 1:
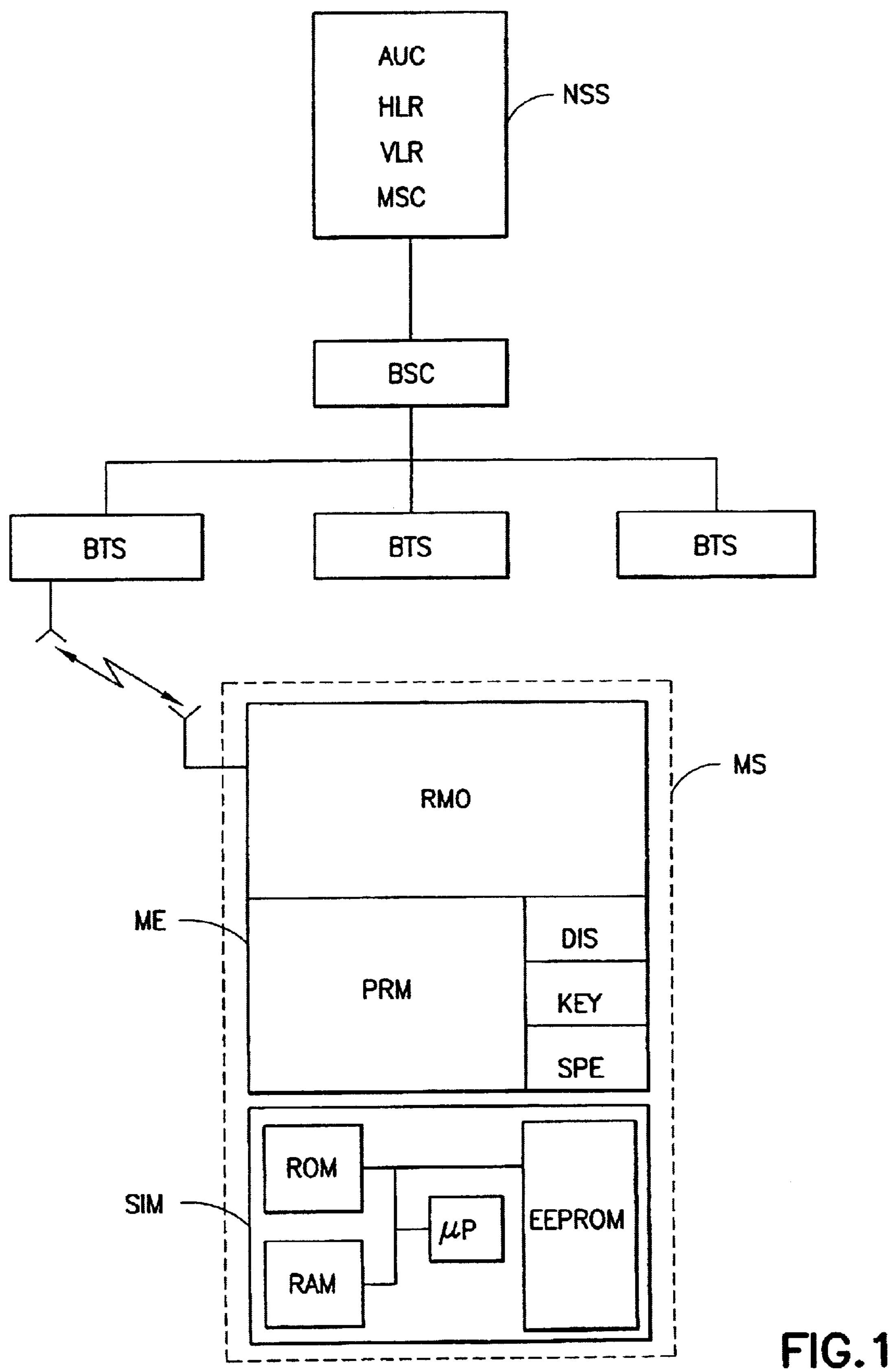

The invention is described in relation to a mobile telephone network, such as a cellular network. However, this is merely illustrative of the invention, is provided only by way of example, and does not limit the invention to this particular usage.

This invention can be used in several different mobile telephone networks, such as GSM (Global System for Mobile communications) and PCS (Personal Communication System). In GSM, for example, the operator of the network is typically a telephone company. The network includes a network subsystem ("NSS"), a set of at least one, and in practice several base transceiver stations, or base stations ("BTS"), one or more base station controllers ("BSC"), and mobile stations ("MS").

The network subsystem NSS includes a mobile switching center ("MSC"), a visitors location register ("VLR"), a home location register ("HLR") and a subscriber authentication center ("AUC"). These are standard, well known components of a telephone network, and details thereof can be found in "GSM-Resèau et services" by J. Tisal, 2nd Ed., published by Masson August, 1997. Some operational explanations for these components are provided below.

Each one of the mobile stations MS includes a mobile apparatus ("ME"), i.e. a telephone, and a SIM.

The telephone ME includes a radio module ("RMO"), a processing module ("PRM"), a screen display ("DIS"), a keyboard ("KEY") and at least one speaker ("SPE"). These are standard well known components of a mobile telephone.

The SIM includes a microprocessor ("$\mu$P"), a nonvolatile read only memory ("ROM"), a volatile random access memory as its working memory ("RAM"), and a data memory of the type that can be erased electrically and is programmable, of the Flash PROM or EEPROM type.

The SIM also includes an interpreter that is capable of executing programs written in a high-level computer language. In particular, this is a Java language interpreter stored in the ROM of the SIM.

Each SIM is customized before it is marketed. This customization prepares the module for its intended functions and involves, for example, encoding data in non-volatile memory (e.g. ROM) such data being related to the type of subscription (e.g., the network which can be used, telephone number, cryptographic keys) and comprises small programs known as applets.

Subscriber identity information about the network subscribers is stored in a data base of the register HLR. Each subscriber is able to access one or more services. The services to which a subscriber is entitled to have access are also stored in the data base of the register HLR.

When a subscriber who has a customized SIM wishes, for example, to communicate with another subscriber, he plugs his SIM into the telephone ME, and then puts the telephone into operation. The processing module PRM of this telephone ME will, first, verify the presence of the SIM module and, second, will ask the subscriber to identify himself by entering his personal identification code ("PIN") using the keyboard ("KEY"). The microprocessor $\mu$P compares this PIN code with the code in the SIM module's ROM and, if they agree, use of the telephone ME is enabled.

A second identification is required, however, when the subscriber actually wishes to gain access to a network service. For this purpose, the NSS sends a message to the BSC/BTS which is transmitted, over the air, to the mobile station ("MS"). With this message the network asks the telephone ME to provide, firstly, the subscriber's subscription number, which is stored in the SIM. This subscription number is transmitted to the network subsystem NSS from the module RMO via the BTS/BSC to the register HLR of the network subsystem NSS. Secondly, the NSS sends via the BSC/BTS a message to the MS which is inputted to the SIM. The message received in the SIM is encoded using an algorithm with a secret key recorded in a read-protected storage space of the SIM. The result of the encoding is sent to the BSC/BTS and to the AUC in the NSS. The result of the encoding is decoded in the AUC which stores the secret key of each of the subscribers. If the decoding is good, i.e. if the message has been coded by the correct secret key, the subscriber is authenticated. Thus, for each request for authorization for access to a particular service, a subscriber identification check is carried out within the authentication center AUC.

In accordance with principles of the present invention, the subscriber can selectively execute, under certain conditions, one or more game programs using his mobile station MS.

In this regard, once the subscriber has been identified by the NSS, a game program is transmitted by the station controller BSC from a program provider (not shown, but which is, for example, a server connected to the NSS) to a base station BTS. The base station BTS then transmits the program to the radio module RMO of the mobile station MS which is equipped with a SIM. The processing module PRM of the mobile station MS then loads the game program into the EEPROM of the SIM module where it is added to the game programs, already present in that memory, if any.

When the subscriber wishes to have the mobile station MS execute a game program, he produces a game instruction, for example, by pressing a key on the keyboard KEY of the telephone.

This game instruction may involve the making of a selection by the subscriber from among the available games presented on the display DIS of the telephone ME. This instruction may cause the processing module PRM to verify that there is at least one game program available in the EEPROM memory of the SIM module. In the case where several game programs are available, representations of these programs are shown on the display DIS, notably in the form of icons, so that the subscriber can make his choice by picking one icon.

The game program selected is then executed by the mobile station MS after having been interpreted by the interpreter of the SIM module. (Of course, the game program is coded in a computer language which is known to the interpreter. For example, the computer language Java is known by the interpreter Java.) For the purpose of playing the game, display DIS, keyboard KEY and speaker SPE of the mobile station MS, which are controlled by the processing module PRM, which is itself controlled by the SIM module, enable use of the display, the input commands, and the output of the sound for executing the game. For example, visual game instructions are presented on the display DIS, and audio instructions are emitted by the SPE to play the game. The details of how the SIM controls processing module PRM are disclosed in ETSI's GSM 11.14, July 1996, Version 5.1.0.

It will be noted that when the game program is being executed the network can be accessible (i.e., the telephone is "on-line") or the network can be non-accessible (i.e., the telephone is "off-line"). If the telephone is on-line and a call is made to that telephone, the subscriber can receive the telephone call even while the game program is being executed. In such a case, the processing module PRM recovers control, and the game is stopped. The manner by which the PRM recovers control is described in the above-mentioned GSM 11.14 publication. If the telephone is off-line, the subscriber cannot receive telephone calls while the game is being executed.

When the execution of the game program is completed, or when the subscriber wishes to interrupt its execution, an instruction to that effect is given to the SIM module. The $\mu$P of the SIM then controls the PRM accordingly.

In one particularly advantageous embodiment of the invention, the operator enables the remote loading of game programs directly into the subscriber's SIM module when the subscriber has used the services offered by the operator a certain number of times or for a certain period of time. The operator aims to encourage the subscribers to increase their consumption of telephonic units, and wants to reward those who consume many units. Therefore, the operator can send game programs (over the air) to a SIM, for example, at the end of a telephonic conversation, when n units have been consumed. The loading can be automatic or it can be proposed to the user (i.e., "do you want the loading of a game?"). Once the game program has been loaded in the SIM, such game can be played. This game program can then be executed whenever the subscriber wishes.

In another embodiment of the invention, one or more game programs are loaded into the EEPROM memory of the subscriber's SIM during its customization. Thus, the operator can promote the launching of new products with game programs.

It will be noted that the fact that the game program is stored in the EEPROM memory of the SIM associated with the subscriber prevents any fraud with regard to game programs. The game programs can be executed only by the subscriber because such execution is carried out under control of the SIM, and the SIM is operational only if the correct PIN code is given. Also, the game programs cannot be copied from the SIM without authorization. Moreover, because the SIM module stores the game program the program can be executed, by the SIM module, on another portable telephone, when such SIM module is plugged into that other portable telephone. A SIM can effectively be used with any telephone ME.

I claim:

1. A method of using a mobile apparatus (ME) having a screen, a keyboard and a loudspeaker, the mobile apparatus being provided with a subscriber identification module (SIM) including an interpreter of programs written in a computer language, the mobile apparatus being part of a telecommunications network managed by an operator, the method comprising the steps of:

loading a game program written in the computer language into a memory of the subscriber identification module and storing the program therein;

interpreting the game program using the interpreter of the subscriber identification module; and executing the game program, which was interpreted by the interpreter of the subscriber identification module, with resources located in the mobile apparatus and wherein said resources do not include the resources of the subscriber identification module, so that the game can be played even if the mobile apparatus is off-line with respect to the telecommunication network.

2. A method according to claim 1, further comprising the step of transmitting the game program by base station (BTS) from the network to the mobile apparatus (ME).

3. A method according to claim 1, wherein said step of loading the game program into the memory of the subscriber identification module is carried out during a customization operation for said module.

4. A method according to claim 1, wherein the network is a GSM network.

5. A method according to claim 1, wherein the mobile apparatus (ME) is a mobile telephone.

6. A method according to claim 1, wherein the subscriber identification module is in a card format.

7. A method according to claim 1, wherein the computer language is a Java language and the interpreter is a Java interpreter.

8. A method according to claim 1, further comprising the steps of a subscriber introducing his subscriber identification module (SIM) into the mobile apparatus, and the subscriber enters an identification number with the keyboard of the mobile apparatus.

9. A method according to claim 1, further comprising the step of the subscriber giving a game instruction to the keyboard of the mobile apparatus in order to execute the game program.

10. A method according to claim 2, further comprising the step of the operator enabling the game program to be loaded into the subscriber identification module when the subscriber has used the services offered by the operator a predetermined number of times or for a predetermined period of time.

11. A method according to claim 2, further comprising the step of the operator enabling the game program to be loaded into the memory of the subscriber identification module when said subscriber has used a predetermined number of telephone units.

12. A method according to claim 1, further comprising the step of indicating with the mobile telephone that the game program is loaded into the memory of the subscriber identification module.

13. A method according to claim 1, further comprising the step of controlling the mobile apparatus so that the game is played off-line.

* * * * *